United States Patent
Saalbach et al.

[11] Patent Number: 5,407,256
[45] Date of Patent: Apr. 18, 1995

[54] LOAD-SENSITIVE TWIN BRAKE POWER CONTROLLER WITH CUP-TYPE DUST COVER

[75] Inventors: Kurt Saalbach, Moerfelden-Walldorf; Rudolf Cezanne, Hofheim; Dieter Fueller, Ruesselsheim, all of Germany

[73] Assignee: Alfred Teves GmbH, Germany

[21] Appl. No.: 969,245

[22] PCT Filed: May 2, 1992

[86] PCT No.: PCT/EP92/00955
§ 371 Date: Feb. 19, 1993
§ 102(e) Date: Feb. 19, 1993

[87] PCT Pub. No.: WO93/00237
PCT Pub. Date: Jan. 7, 1993

[30] Foreign Application Priority Data
Jun. 20, 1991 [DE] Germany .................. 41 20 358.5

[51] Int. Cl.⁶ .................. B60T 8/18; F16J 3/04
[52] U.S. Cl. .................. 303/22.8; 188/195
[58] Field of Search .................. 303/9.69, 22.1, 22.7, 303/22.8; 188/195, 322.12; 277/212 FB

[56] References Cited

U.S. PATENT DOCUMENTS
3,904,253  9/1975  Riquart .................. 303/22.1
4,219,242  8/1980  Carre .................. 303/9.69 X
4,332,423  6/1982  Schopper et al. .................. 303/22.7

FOREIGN PATENT DOCUMENTS
3315763  10/1984  Germany.

*Primary Examiner*—Josie A. Ballato
*Attorney, Agent, or Firm*—Robert P. Seitter; J. Gordon Lewis

[57] ABSTRACT

The invention relates to a load-sensitive twin brake power controller whose change-over pressure is determined by a lever through a rocking element. The housing is extruded. Traditionally, a large-volume cylindrical chamber for the accommodation of the rocking element and a circular dust cover seat are mill cut into the housing. Such a loss of material is avoided by the present invention in that in conjunction with the extruded profile section two housing projections are molded which are each provided with one groove. Between the latter the dust cover is pressed with a sheet metal ring against the housing until the sheet metal ring comes to be locked in the grooves.

12 Claims, 2 Drawing Sheets

5,407,256

LOAD-SENSITIVE TWIN BRAKE POWER CONTROLLER WITH CUP-TYPE DUST COVER

BACKGROUND OF THE INVENTION

The invention is related to a load-sensitive twin brake power controller.

A twin brake power controller of the kind under review is known from the German patent specification No. 3,315,763. For the actuation of the control pistons, this controller is furnished with a rocking element which has an axially symmetrical configuration. The loaded ends of the control pistons, the rocking element and part of a control tappet which is fixed to the load-sensitive movable lever are disposed within a cylindrical chamber which is mill cut into the housing. A dust cover seat is milled around said chamber into the housing edge around which a rolling diaphragm-type dust cover is clamped which defines said cylindrical chamber at the front face. The control tappet leads into this chamber from the outside through a central hole in the dust cover. The dust cover fastens behind a circumferential bead at the control tappet.

The use of rocking elements, irrespective of what their shape may be, has proved useful in the load-sensitive actuation of twin controllers. A flexible dust cover fixed to the housing is indispensable in order that the control piston ends projecting into the chamber, which is free of hydraulic pressure fluid, and their seals are protected against soiling. The housing is cut at low cost from a strand which is extruded with the profile section of the housing. The cylindrical chamber, however, has to be fabricated subsequently by a machining operation just like the seat of the dust cover. As a consequence, substantial material is wasted and a substantial amount of labor is required.

SUMMARY OF THE INVENTION

The present invention has the object of creating a brake power controller of the kind under review in which there is little wasted metal and reduced labor is required for the manufacture of the housing.

Instead of machining, the housing is given its shape directly with the extruded profile section which affords placement of the dust cover so that no finishing operation is needed. Chips do not result during the fabrication of the stepped bores and of the connections for the hydraulic pressure fluid.

In this context, the dust cover itself is, advantageously, cup-shaped so that its volume substitutes the volume of the cylindrical chamber.

Further advantageous features will be revealed by the undermentioned description of a preferred embodiment, making reference to the drawings:

DETAILED DESCRIPTION OF THE INVENTION

Figure 1:
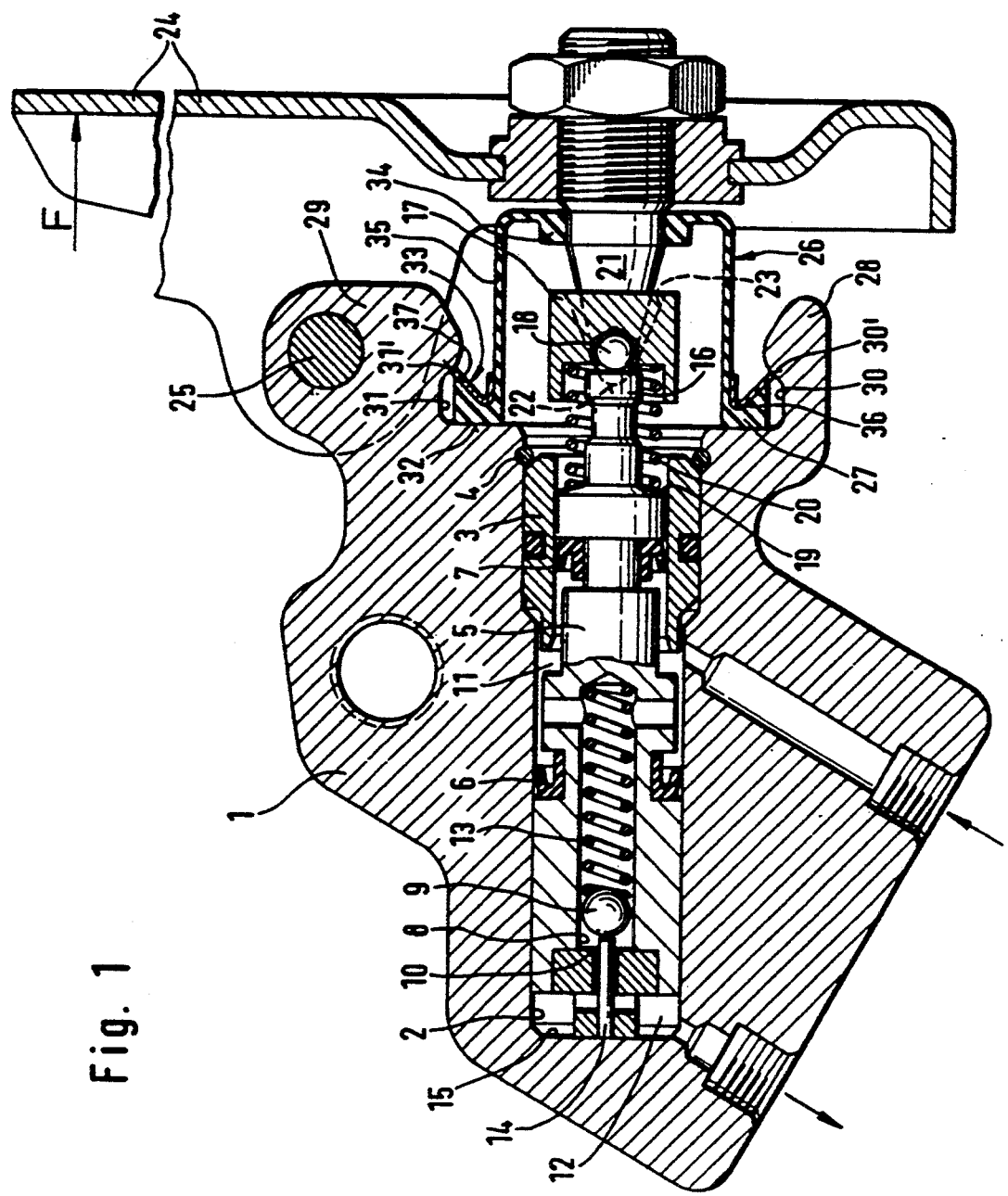
FIG. 1 shows a cross-section through the brake power controller of the present invention.

The brake power booster illustrated in FIG. 1 is represented in cross-section through a control unit. A second identical control unit, not being visible, is disposed parallel to the first one and behind it. In the range of the actuating apparatus, the sectional plane is shifted into the axis of symmetry, as is outlined by a dash-dotted line in FIG. 2.

In its housing 1 the brake power controller has a bore 2 within which the stepped piston 5 is axially slidingly guided with the aid of the guide bushing 3 and of the circlip 4. Stepped piston 5 is sealed off with respect to the wall of the bore 2 and of the guide bushing 3 by the sealing sleeve 6 and 7, respectively. It is provided with an axial bore 8 within which the valve closing member 9 is positioned which jointly with the valve seat 10 acts as a control valve between the inlet chamber 11 and the outlet chamber 12. The valve closing member 9 is for this purpose stressed in the closing direction by the compression spring 13 and in the illustrated pressureless condition lifted off from its valve seat 10 by the tappet 14 which takes support at the front wall 15 defining the housing bore 2.

The end 16 of the stepped piston 5 which faces away from said front wall 15 projects out of the housing bore 2 into the chamber which is free of hydraulic pressure fluid. Jointly with the end not shown in the drawing of the second stepped piston it is subject to the pressure exerted by the rocking element 17 through the ball 18 fitted into the latter in the opening direction of the valve 9, 10. For stabilization of the position of the rocking element 17, the compression spring 20 is disposed between the latter and the step 19 at the stepped piston 5. The point of impact 22 of the tappet 21 at the rocking element 17 is situated in the middle between the two control units, that is to say, nearer to the housing 1 than the point of contact of the ball 18 at the stepped piston end 16. The tappet 21 has the shape of a pointed cone with a rounded peak, just like the depression 23 in which the point of impact is disposed. The cone angle of the depression 23 is, however, larger than that of the tappet 21, so that a limited rocking motion is possible. Said tappet 21 is screwed to the control lever 24 which is swingable about the joint 25 and is subject to the action of the load-sensitive force F.

The dust cover 26 is tightly abutted against the housing surface 32, on one side, and against the tappet 21, on the other side. It is of flexible material, for example of rubber, and deformable with the movement of the lever. It has cup-type shape and is formed with a circumferential dish-type edge 27 which is in abutment against the housing surface 32 and which increases in thickness outwardly. The dust cover edge 34 which surrounds the tappet 21 is reinforced in order to avoid any wear and is adapted to the periphery of the tappet.

For mounting the dust cover 26, the profile section of each of the two housing projections 28 and 29, which are extruded jointly with the housing 1 and which define the housing surface 32, is formed with a wide groove 30, 31 respectively. Said grooves 30 and 31 extend at right angle to the piston axis, parallel to the plane in which the stepped pistons are disposed and are positioned at the side of each of the housing projections 28 and 29 which faces the rocking element 17.

The dust cover 26 is fixed to the housing surface 32 together with the stamped sheet metal ring 33. At its longitudinal sides, facing the housing projections 28 and 29, said sheet metal ring 33 has a rim 37 being bent over outwardly at an acute angle, whereas with its internal circumference it is adapted over its whole surface to the wall 35 of the dust cover, so that its profile section is V-shaped along the longitudinal sides.

The dust cover 26 is fixed by sliding the sheet metal ring 33 with its bent edge 36 ahead over the dust cover 26 and is urged against the housing 1 until the outwardly bent rim 37 snaps into the grooves 30 and 31. For this reason, the width of the grooves corresponds approximately to the sum of the thickness of the dish-type edge 27 of the dust cover 26 and of the axial dimension of the bent rim 37 of the sheet metal ring 33. In the incorporated condition, the sheet metal ring 33 will urge the dust cover tightly against the housing surface 32 by taking support at the walls 30' and 31' of the grooves 30 and 31 forming a dust free seal. Thanks to the sloping of the groove walls 30' and 31', a balance of inaccuracies in the event of a varying thickness of the dish-type edge 27 will be possible insofar as the bent rim 37 of the sheet metal ring 33 shears in more or less deeply.

Figure 2:
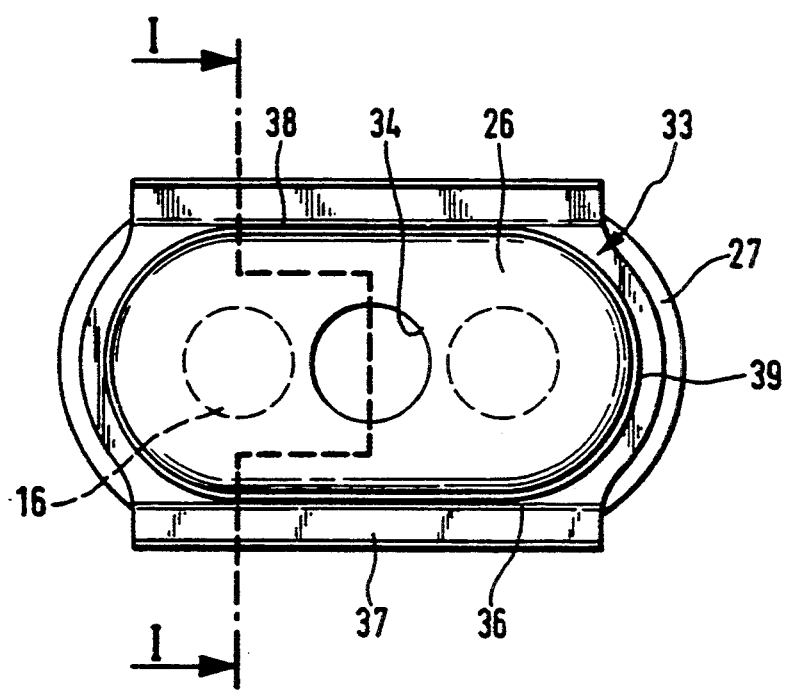
FIG. 2 shows a top view of a dust cover with sheet metal ring.

The top view of the dust cover 26 with the sheet metal ring 33, shown in FIG. 2, makes the shape of the two elements evident. On one hand, the sectional line in FIG. 1 and, on the other hand, the positions of the stepped piston end 16 and of its counterpart are outlined by dash-dotted lines. The horizontal projection of the dust cover 26 and of the sheet metal ring 33 corresponds to two semicircles which are interconnected by straight lines. In the straight ranges 38 the rim 37 is bent over at an acute angle, in the curvatures 39 it plainly adheres to the edge of the dust cover. The distance between the straight ranges 38 (at the intersection of the dish-shaped edge 27 and the straight ranges 38) being smaller than the smallest distance between the housing projections 28, 29 and the diameter of the hole in the bottom being adapted to that of the said tappet.

We claim:

1. A load-sensitive twin brake power controller for a hydraulic pressure fluid-actuated brake system, said controller having an extruded housing furnished with two bores disposed beside each other, a stepped piston with an end sealedly projecting out of each of said bores, the projecting ends of said stepped pistons being loaded along a connecting line by a rocking element which in its centre is subject to the action of a tappet, said tappet being rigidly coupled to a load-sensitive movable control lever, and a flexible dust cover which protects said projecting ends of the stepped pistons, said rocking element and at least a part of the tappet from contaminants, said housing being formed with two projections each having one straight groove, said grooves having generally equal width and generally equal depth, and extend generally parallel to the connecting line of the said two stepped piston ends and are positioned in facing surfaces of said housing projections, said housing projections together with said grooves being extruded in said housing, wherein said dust cover has a cup-type configuration with bottom and side walls and is furnished with a dish-type edge along at least one of said side walls and in its bottom with a central hole, and wherein said dust cover has horizontal projections having the shape of two semicircles which are interconnected by straight portions, the distance of the said straight portions from each other at the intersection of the said dish-type edge and said straight portions being smaller than the smallest distance between said housing projections and the diameter of the said center hole in the bottom being adapted to that of the said tappet.

2. A brake power controller as claimed in claim 1 wherein the edge of said central hole and said dish-type edge are thickened.

3. A brake power controller as claimed in claim 1, wherein said dust cover is fixed to said housing by an elastically deformable sheet metal ring, said ring having an inside lip adapted to adjoin said side wall of said dust cover and whose profile section is V-shaped over at least part of its circumference, said ring having a rim which is bent outwardly at an acute angle from said lip defining a bent edge.

4. A brake power controller as claimed in claim 3, wherein said ring has straight ranges, said rim extends over at least a part of the said straight ranges of the circumference of the said ring and in that in these said ranges the distance of the opposite outside edges of said ring is larger than the smallest distance of said housing projections from each other and smaller than the distance of the deepest points of the said grooves from each other, and in that the axial dimension between said bent edge and an outer edge of said ring is not larger than the width of the said grooves less the smallest thickness of the said dish-type edge.

5. A brake power controller as claimed in claim 4, wherein the dish-type edge of said dust cover adheres between the said housing projections over its whole surface to the said housing, in that with its said bent edge said ring presses said dish-type edge against the said housing by taking support with the outer edge of its V-shaped profile section at walls of the said grooves, and in that by said central hole of the said dust cover the said tappet is guided.

6. A brake power controller as claimed in claim 5, wherein the walls of the said grooves are sloped.

7. A load-sensitive twin brake power controller for a hydraulic pressure fluid-actuated brake system, said controller having an extruded housing furnished with two bores disposed beside each other, a stepped piston with an end sealedly projecting out of each of said bores, the projecting ends of said stepped pistons being loaded along a connecting line by a rocking element which in its centre is subject to the action of a tappet, said tappet being rigidly coupled to a load-sensitive movable control lever, and a flexible dust cover which protects said projecting ends of the stepped pistons, said rocking element and at least a part of the tappet from contaminants, said housing being formed with two projections each having one straight groove, said grooves having generally equal width and generally equal depth, and extend generally parallel to the connecting line of the said two stepped piston ends and are positioned in facing surfaces of said housing projections, said housing projections together with said grooves being extruded in said housing, wherein said dust cover has a cup-type configuration with bottom and side walls and is furnished with a dish-type edge along at least one of said side walls and in its bottom with a central hole, and wherein said dust cover is fixed to said housing by an elastically deformable sheet metal ring, said ring having an inside lip adapted to adjoin said side wall of said dust cover and whose profile section is V-shaped over at least part of its circumference, said ring having a rim which is bent outwardly at an acute angle from said lip defining a bent edge.

8. A twin brake power controller as claimed in claim 7, wherein said dust cover has horizontal projections having the shape of two semicircles which are interconnected by straight portions, the distance of the said straight portions from each other at the intersection of the said dish-type edge and said straight portions being smaller than the smallest distance of said housing projections and the diameter of the said central hole in the bottom being adapted to that of the said tappet.

9. A brake power controller as claimed in claim 8, wherein the edge of said central hole and said dish-type edge are thickened.

10. A brake power controller as claimed in claim 7, wherein said ring has straight ranges, said rim extends over at least a part of the said straight ranges of the circumference of the said ring and in that in these said ranges the distance of the opposite outside edges of said ring is larger than the smallest distance of said housing projections from each other and smaller than the distance of the deepest points of the said grooves from each other, and in that the axial dimension between said bent edge and an outer edge of said ring is not larger than the width of the said grooves less the smallest thickness of the said dish-type edge.

11. A brake power controller as claimed in claim 10, wherein the dish-type edge of said dust cover adheres between the said housing projections over its whole surface to the said housing, in that with its said bent edge said ring presses said dish-type edge against the said housing by taking support with the outer edge of its V-shaped profile section at walls of the said grooves, and in that by said central hole of the said dust cover the said tappet is guided.

12. A brake power controller as claimed in claim 10, wherein the walls of the said grooves are sloped.

* * * * *